United States Patent [19]

Koubek

[11] 3,798,496

[45] Mar. 19, 1974

[54] ACTIVE HORIZONTAL CONVERGENCE CIRCUIT WITH TWO SEPARATELY ADJUSTABLE WAVEFORMS

[75] Inventor: Michael Koubek, Munich, Germany

[73] Assignee: Siemens Aktiengesellschaft, Berlin & Munich, Germany

[22] Filed: June 5, 1972

[21] Appl. No.: 259,597

[30] Foreign Application Priority Data

June 22, 1971 Germany .......... 2130979

[52] U.S. Cl. ........ 315/13 C, 315/27 TD, 315/27 GD

[51] Int. Cl. .......... H01j 29/50

[58] Field of Search ......... 315/13 C, 27 TD, 27 GD, 315/27 R

[56] References Cited

UNITED STATES PATENTS

| | | | |
|---|---|---|---|
| 3,163,797 | 12/1964 | Singleback | 315/13 C |
| 3,303,380 | 2/1967 | Kozikowski | 315/27 R |
| 3,426,245 | 2/1969 | Yurasek et al. | 315/27 TD |
| 3,488,551 | 1/1970 | Bryden | 315/27 TD X |
| 3,553,478 | 1/1971 | Steinbacher | 315/27 TD X |
| 3,602,768 | 8/1971 | Williams, Jr. et al. | 315/27 TD |
| 3,419,749 | 12/1968 | Gerstein | 315/13 C |
| 3,611,001 | 10/1971 | Bacon | 315/27 TD X |

*Primary Examiner*—Benjamin R. Padgett
*Assistant Examiner*—P. A. Nelson
*Attorney, Agent, or Firm*—Hill, Sherman, Meroni, Gross & Simpson

[57] ABSTRACT

An active horizontal convergence circuit which employs separately adjustable means for converging the right and left halves of the picture. A bridge circuit is fed by two oppositely phased horizontal frequency sawtooth signals. The legs of the bridge have unilateral conducting devices so that only one side of the bridge is conducting at one time. The bridge has a pair of voltage dividers which have outputs connected to a common circuit point and from that point to an active circuit which supplies the oppositely phased currents to the horizontal convergence coil.

8 Claims, 2 Drawing Figures

ACTIVE HORIZONTAL CONVERGENCE CIRCUIT WITH TWO SEPARATELY ADJUSTABLE WAVEFORMS

BACKGROUND OF THE INVENTION

FIELD OF THE INVENTION

The field of art to which this invention pertains is convergence circuits for television receivers and in particular to convergence circuits utilizing circuit means for controlling the convergence of the right and left halves of the picture separately.

SUMMARY OF THE INVENTION

It is an important feature of the present invention to provide a new horizontal convergence circuit.

It is another feature of the present invention to provide a horizontal convergence circuit for controlling the right and left halves of the picture separately.

It is a principal object of the present invention to provide a horizontal convergence circuit which employs an active circuit means for applying positive and negative going sawtooth signals through a shaping and amplifying circuit to the convergence coils of a television receiver.

Another object of the present invention is to provide a circuit as described above wherein a bridge circuit is utilized with opposite polarity sawtooth signals coupled to opposite terminals of the bridge and with an output signal being derived from a common circuit point intermediate adjustable voltage dividers.

It is another feature of the present invention to provide a circuit as described above wherein the output from the voltage dividers is coupled to a circuit point intermediate oppositely connected zener diodes.

It is also an object of the invention to provide a circuit wherein the output of the voltage dividers is coupled to the control electrodes of a pair of oppositely connected transistors.

These and other objects, features and advantages of the present invention will be understood in greater detail from the following description and the associated drawings wherein reference numerals are utilized to designate a preferred embodiment.

DESCRIPTION OF THE PREFERRED EMBODIMENT

Active circuit arrangement for horizontal convergence circuits are known and described for instance in *Funkschau*, 1968, Vol. 16, ppgs. 501–504. Under such an arrangement, two sawtooth halves are separately produced and supplied to the convergence circuit. The cost, however, of providing circuits which offer separate adjustment for the individual picture halves have been quite costly adn difficult to obtain. The present invention provides a circuit by which adjustment of the amplitude and polarity of the convergence currents for each half of the picture can be readily accomplished.

Figure 1:
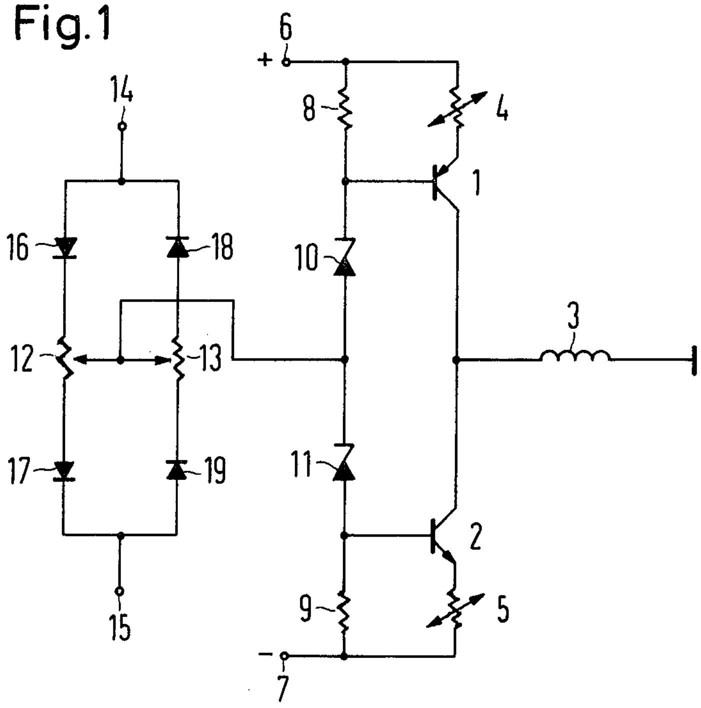
FIG. 1 is a schematic of a horizontal convergence circuit according to the present invention utilizing a bridge circuit which has an output coupled to a circuit point between a pair of oppositely connected zener diodes.

Referring to the drawings, FIG. 1 shows a horizontal convergence circuit which includes a pair of transistors 1 and 2 with their collectors connected together in series. The collector of the transistor 1 conducts positive current to the horizontal convergence coil 3, and the collector of the transistor 2 conducts negative current to the coil 3.

The emitters of the transistors 1 and 2 are coupled to opposite poles 6 and 7 of a voltage source. Adjustable resistors 4 and 5 are connected between the emitters and the respective poles. The base of the transistor 1 is coupled to the voltage source pole 6 through a resistor 8, and the base of the transistor 2 is coupled to the voltage source pole 7 through a resistor 9. Both bases are coupled together through a pair of series connected zener diodes 10 and 11. The diodes 10 and 11 are coupled in opposite phase relation to the base to emitter connections of the associated transistors.

The connection point between the two zener diodes 10 and 11 are coupled to a tap between voltage dividers 12 and 13. Both voltage dividers 12 and 13 are adjustable and are connected to opposite sides to circuit inputs 14 and 15. Opposite phase sawtooth signals are connected to the inputs 14 and 15. Two parallel paths are provided for the sawtooth signals. One of these is from the circuit point 14 through the diodes 16 and 17 and the other is from the circuit point 15 through the diodes 18 and 19.

The terminals 14 and 15 are supplied with sawtooth signals of opposite polarity which may be derived by integration from the horizontal pulses at the horizontal transformer. The diodes 16 and 17 are conductive only during the first half line, namely, when the sawtooth signal at the input 14 is positive and the sawtooth signal 15 is negative. The reverse is true for the diodes 18 and 19. These diodes conduct only during the second half line when the sawtooth signal at the input 14 is negative and that at the input 15 is positive. Thus, the first half line is adjusted by the voltage divider 12, and the second half line is adjusted by the voltage divider 13. The adjustable voltage dividers are such that the signal value is zero at the center, positive at one end, and negative at the other end. Hence, all values between a positive and negative sawtooth can be adjusted.

If both taps of the two voltage dividers 12 and 13 are connected as shown, nothing will occur since the two are decoupled from each other by means of the diodes 16 through 19. The two adjustments do not influence each other. This means that the desired separate adjustments of the right and left portions of the picture can be achieved.

Since both positive and negative currents must exist in the horizontal convergence coil 3, but zero current must occur at the center of the picture, the two transistors 1 and 2 are used to apply the positive and negative portions respectively. The operational voltage for the transistors 1 and 2 amounts to the potential difference between the voltage of the pole 6 and the reference potential at the opposite side of the coil 3. The negative of this of course applies for the transistor 2.

Since the sawtooth signals of the inputs 14 and 15 do not have a direct current portion, the value is equal to zero at the center. However, in order to assure that the transistor 1 will be non-conducting at the image center, the base voltage must be positive at that time. At the same time, it must be negative for the transistor 2. To accomplish this, two zener diodes 10 and 11 have been provided which add a direct voltage component to the sawtooth waveforms.

The sawtooth waveforms are given an approximate parabolic shape by the use of non-linear inverse coupling resistors such as voltage dependent resistors and the like.

Figure 2:
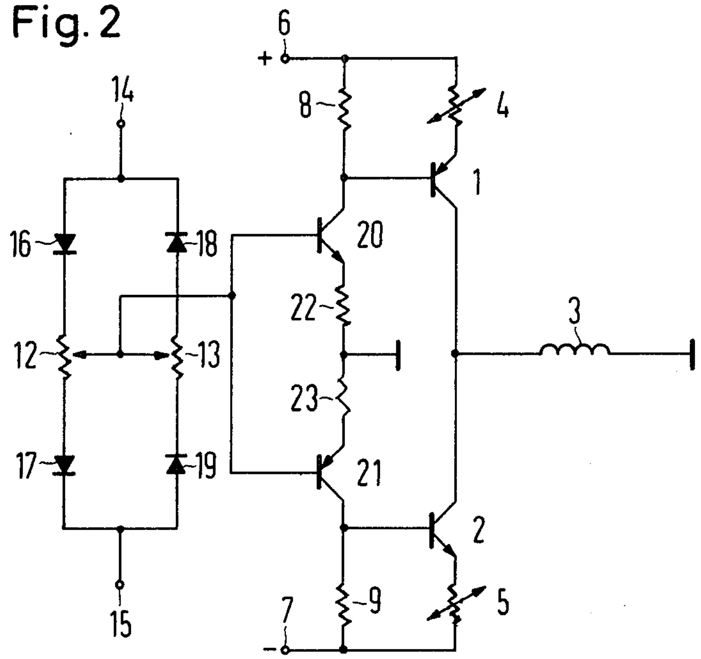
FIG. 2 is a schematic similar to FIG. 1 wherein the output of the voltage dividers of the bridge circuit is coupled to the base electrodes of a pair of oppositely connected transistors.

The embodiment shown in FIG. 2 is similar to the embodiment of FIG. 1, however, in place of the zener diodes 10 and 11 of FIG. 1, transistors 20 and 21 are used. The transistors 20 and 21 have their collectors coupled to the base of the transistors 1 and 2 respectively. The emitters of the transistors 20 and 21 are connected together through series resistors 22 and 23. The center point between the resistors 22 and 23 is connected to a reference potential as shown. The base of the transistor 20 is coupled to the base of the transistor 21, and the two are coupled to the connection between the adjustable voltage dividers 12 and 13. The transistors 20 and 21 are turned off at the image center by the operational voltage. As a result, no current is supplied to the coil 3 at the center of the picture. The arrangement of FIG. 2 has the advantage that the operational voltage of the transistors does not have to be as precise as that required for the zener diodes. Therefore, the arrangement of FIG. 2 is less sensitive to fluctuations of the voltage supply.

I claim:

1. A horizontal convergence circuit for a color television receiver comprising: a first pair of transistors having their emitter-collector paths connected in series, a horizontal convergence coil connected from a point of reference potential to a point between the emitter-collector paths of said transistors, means for applying the positive pole of a potential source to bias one of the transistors, means for applying the negative pole of a potential source to bias the other of said transistors, the bases of said transistors being coupled to a common circuit point, a bridge circuit having first and second inputs and having parallel paths between inputs with oppositely pole unilateral conducting means in each parallel path, a voltage divider in each parallel path, and means for coupling an output from each voltage divider to said common circuit point.

2. A horizontal convergence circuit for a color television receiver in accordance with claim 1 wherein said unilateral conducting means in each path comprises a pair of diodes, said diodes forming two legs of the bridge.

3. A horizontal convergence circuit for a color television receiver in accordance with claim 2 wherein each voltage divider is coupled between the two diodes forming the two legs of the bridge in the respective parallel paths.

4. A horizontal convergence circuit for a color television receiver in accordance with claim 3 wherein the voltage dividers have adjustable taps which are coupled together and then coupled to said common circuit point.

5. A horizontal convergence circuit for a color television receiver in accordance with claim 1 wherein a zener diode is coupled between the common circuit point and the base of each of said transistors.

6. A horizontal convergence circuit for a color television receiver in accordance with claim 1 wherein a second pair of transistors are coupled in series with their collector-emitter paths being coupled to the base of respective ones of said first pair of transistors in such manner as to conduct between those bases and a reference potential, said reference potential being coupled to a point between said collector-emitter paths of said second pair of transistors, the bases of said second pair of transistors being coupled together to form said common circuit point.

7. A horizontal convergence circuit for a color television receiver in accordance with claim 1 wherein a variable resistor is provided between the emitters of the first pair of transistors and their associated source of biasing potential.

8. A horizontal convergence circuit for a color television receiver in accordance with claim 7 wherein a further resistor is provided between the base of said first pair of transistors and their associated source of operating potential.

* * * * *